United States Patent
Zhang et al.

(10) Patent No.: US 9,843,542 B2
(45) Date of Patent: Dec. 12, 2017

(54) METHOD AND APPARATUS FOR DOWNLOADING AND DISPLAYING PICTURES

(71) Applicant: Tencent Technology (Shenzhen) Company Limited, Shenzhen (CN)

(72) Inventors: Wenbin Zhang, Shenzhen (CN); Chao Huang, Shenzhen (CN); Wei Luo, Shenzhen (CN)

(73) Assignee: TENCENT TECHNOLOGY (SHENZHEN) COMPANY LIMITED, Shenzhen, Guangdong Province (CN)

( * ) Notice: Subject to any disclaimer, the term of this patent is extended or adjusted under 35 U.S.C. 154(b) by 0 days.

(21) Appl. No.: 15/188,881

(22) Filed: Jun. 21, 2016

(65) Prior Publication Data
US 2016/0301640 A1    Oct. 13, 2016

Related U.S. Application Data

(63) Continuation of application No. PCT/CN2015/071780, filed on Jan. 28, 2015.

(30) Foreign Application Priority Data

Apr. 29, 2014 (CN) .......................... 2014 1 0176930

(51) Int. Cl.
  *G06F 15/16* (2006.01)
  *H04L 12/58* (2006.01)
  *H04L 29/06* (2006.01)

(52) U.S. Cl.
  CPC ............ *H04L 51/046* (2013.01); *H04L 51/04* (2013.01); *H04L 51/10* (2013.01); *H04L 51/16* (2013.01); *H04L 51/18* (2013.01); *H04L 65/604* (2013.01)

(58) Field of Classification Search
  USPC ................................. 709/206, 201, 202, 203
  See application file for complete search history.

(56) References Cited

U.S. PATENT DOCUMENTS

2007/0061497 A1*  3/2007  Takatsuka ............ G11B 19/025
                                                              711/100
2008/0065782 A1*  3/2008  Jones ................ G06F 17/30058
                                                              709/240

(Continued)

FOREIGN PATENT DOCUMENTS

CN    101018137 A    8/2007
CN    101150484 A    3/2008

(Continued)

OTHER PUBLICATIONS

Tencent Technology, ISRWO, PCT/CN2015/071780, Apr. 28, 2015, 7 pgs.
Tencent Technology, IPRP, PCT/CN2015/071780, Nov. 1, 2016, 5 pgs.

*Primary Examiner* — Lan-Dai T Truong
(74) *Attorney, Agent, or Firm* — Morgan, Lewis & Bockius LLP

(57) ABSTRACT

A computer-implemented method for downloading and displaying pictures associated with instant messages is performed at a computing device. The computing device receives an instant message having an associated picture and including address information of the picture. The computing device determines whether it is in a first network environment. If so, the computing device displays a thumbnail of the picture on the screen and a visual cue indicating that the picture is being downloaded and starts downloading the picture associated with the instant message according to the address information without receiving a download instruction from a user of the computing device. The thumbnail is then replaced with the picture after the picture is down- (Continued)

loaded. While the picture is being downloaded, the computing device may pause the download when it is no longer in the first network environment and replaces the visual cue with a different one indicating so.

18 Claims, 6 Drawing Sheets

(56) References Cited

U.S. PATENT DOCUMENTS

| | | | |
|---|---|---|---|
| 2011/0066940 A1* | 3/2011 | Asghari Kamrani | G06Q 10/10 715/716 |
| 2014/0067997 A1* | 3/2014 | Saabas | H04L 47/22 709/217 |
| 2014/0237465 A1* | 8/2014 | Lin | H04L 67/1063 717/173 |
| 2015/0015581 A1* | 1/2015 | Lininger | G06T 11/00 345/426 |
| 2015/0215402 A1* | 7/2015 | Matsushima | G06F 17/30017 709/201 |
| 2016/0014479 A1* | 1/2016 | Gower | H04N 21/23418 725/93 |

FOREIGN PATENT DOCUMENTS

| | | |
|---|---|---|
| CN | 103067379 A | 4/2013 |
| CN | 103973547 A | 8/2014 |

\* cited by examiner

METHOD AND APPARATUS FOR DOWNLOADING AND DISPLAYING PICTURES

RELATED APPLICATION

This application is a continuation application of PCT Patent Application No. PCT/CN2015/071780, entitled "METHOD AND APPARATUS FOR DOWNLOADING AND DISPLAYING PICTURES" filed on Jan. 28, 2015, which claims priority to Chinese Patent Application No. 201410176930.2, entitled "PICTURE DISPLAYING METHOD AND APPARATUS" filed on Apr. 29, 2014, both of which are incorporated by reference in their entirety.

TECHNICAL FIELD

The disclosed implementations relate generally to the field of instant messaging, and in particular, to method and apparatus for downloading and displaying pictures associated with an instant messaging application.

BACKGROUND

Along with the development of instant messaging technology, a user may transmit various formats of instant messages, such as texts, audios, pictures and the like, through an instant messaging application. By taking both parties of a session as a first user and a second user for an example, a terminal of the first user may display instant messages transmitted between the first user and the second user in an instant messaging session window for communicating with the second user.

A message having an associated picture means that a picture is displayed in form of a thumbnail. When the terminal of the first user receives a message having an associated picture sent by the second user, firstly a thumbnail is displayed in an instant messaging session window. When the terminal detects an operation that the first user clicks on the thumbnail, a picture associated with the message is downloaded. When the downloading of the picture is finished, the picture is displayed.

When the terminal displays the thumbnail, the content of the picture is fuzzy, and the previewing effect is poor. Furthermore, the terminal may start downloading the picture when it detects the operation that the first user clicks on the thumbnail. Therefore, the operation is tedious, and the efficiency for processing messages is reduced.

SUMMARY

The above deficiencies and other problems (e.g., bad user experience) associated with the conventional approach of downloading and displaying pictures are reduced or eliminated by the present application disclosed below. In some embodiments, the present application is implemented in a computing device (e.g., a PC, a tablet or a smartphone) that has one or more processors, memory and one or more modules, programs or sets of instructions stored in the memory for performing multiple functions. Instructions for performing these functions may be included in a computer program product configured for execution by one or more processors.

In accordance with some embodiments of the present application, a computer-implemented method for downloading and displaying pictures associated with instant messages on a screen of a computing device is performed at the computing device having one or more processors and memory for storing program modules to be executed by the processors. The method includes: receiving an instant message, the instant message having an associated picture and including address information of the picture; determining whether the computing device is in a first network environment or not; when the computing device is in the first network environment: displaying a thumbnail of the picture on the screen and a visual cue indicating that the picture is being downloaded; downloading the picture associated with the instant message according to the address information without receiving a download instruction from a user of the computing device; and replacing the thumbnail with the picture after the picture is downloaded. In accordance with some embodiments of the present application, a computing device includes one or more processors; memory; and one or program modules stored in the memory for performing the method mentioned above. In accordance with some embodiments of the present application, a non-transitory computer readable storage medium stores one or more program modules configured for execution by a computing device that includes one or more processors and memory for performing the method mentioned above.

BRIEF DESCRIPTION OF DRAWINGS

The aforementioned implementation of the invention as well as additional implementations will be more clearly understood as a result of the following detailed description of the various aspects of the invention when taken in conjunction with the drawings. Like reference numerals refer to corresponding parts throughout the several views of the drawings.

To illustrate the technical solutions in the embodiments of the present application more clearly, accompanying drawings required for describing the embodiments are briefly introduced in the following. Obviously, the accompanying drawings in the following description are merely some embodiments of the present application, and persons of ordinary skills in the art may further obtain other drawings according to these accompanying drawings without creative efforts.

DETAILED DESCRIPTION

The technical solutions in the embodiments of the present application are clearly and completely described in the following with reference to the accompanying drawings. Evidently, the embodiments to be described are merely part of rather than all of the embodiments of the present application. All other embodiments obtained by persons of ordinary skills in the art based on the embodiments of the present application without creative efforts shall fall within the protection scope of the present application.

Figure 1:
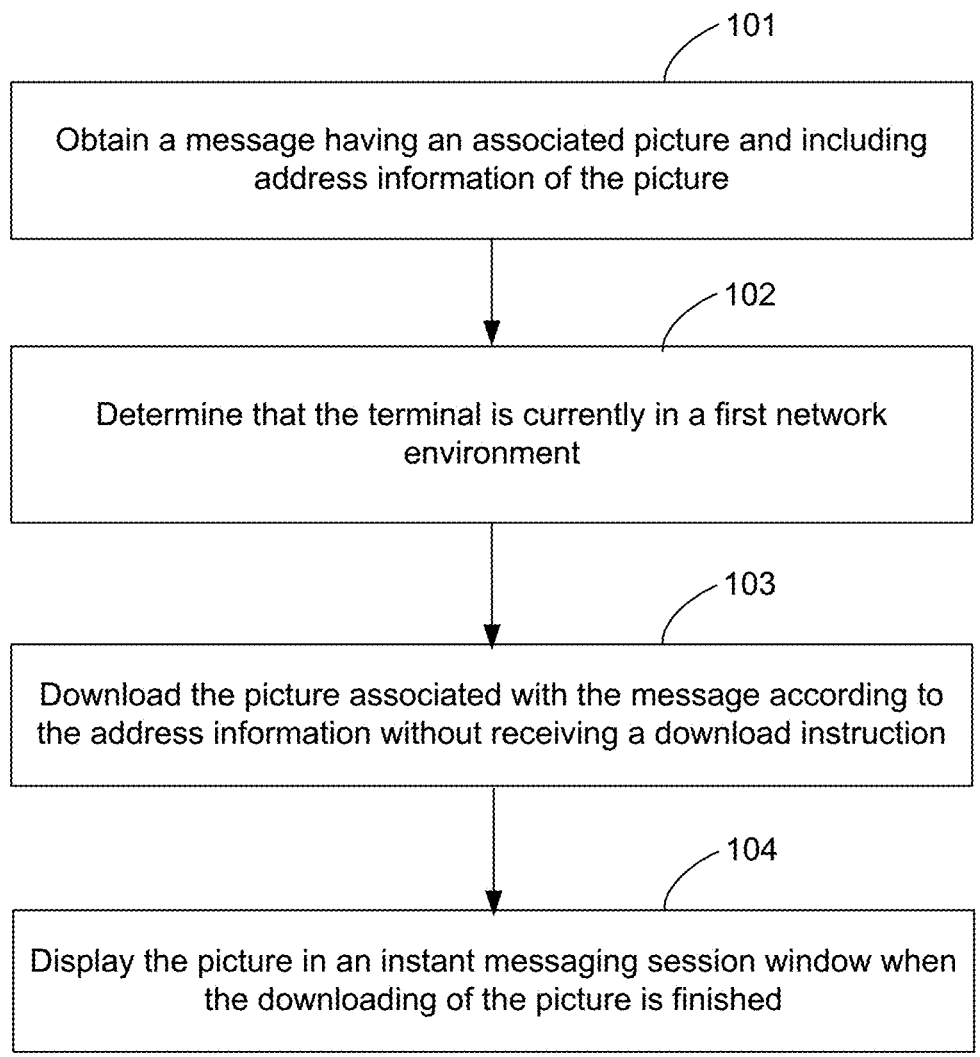
FIG. 1 is a flow chart of a picture displaying method according to some embodiments of the present application.

FIG. 1 is a flow chart of a picture displaying method according to some embodiments of the present application. The execution main body in the embodiments of the present application is a terminal. Referring to FIG. 1, the method comprises the following steps:

Step 101: Obtain a message having an associated picture and including address information of the picture;

Step 102: Determine that the terminal is currently in a first network environment;

Step 103: Download the picture associated with the message according to the address information without requiring a download instruction;

Step 104: Display the picture in an instant messaging session window when the downloading of the picture is finished.

According to the method provided in the embodiments of the present application, the terminal may directly download a picture associated with a message without requiring a download instruction when the terminal obtains the message in a first network environment. Therefore, the picture may be displayed clearly, the previewing effect is improved, the operation of user is simplified, and the efficiency for processing messages is improved.

In some embodiments, after obtaining the message, the method may further comprise: displaying a thumbnail of the message in the instant messaging session window; replacing the thumbnail by the picture in the instant messaging session window when the downloading of the picture is finished.

In some embodiments, the step of downloading the picture associated with the message according to the address information without requiring a download instruction comprises: downloading pictures in a chronological order of message receiving time according to address information of at least one message having an associated picture without requiring a download instruction when obtaining the at least one message.

In some embodiments, the method may further comprise: cancelling the downloading of the picture when a sliding operation of the user in the picture downloading process is detected; obtaining an old instant message corresponding to the sliding operation according to a page sliding distance of the sliding operation and an old message log; downloading a picture associated with an old message according to address information when the old instant message includes the old message having an associated picture.

In some embodiments, the method may further comprise: downloading pictures in a reverse chronological order of message receiving time according to address information of at least one message having an associated picture without requiring a download instruction, when the instant messaging session window runs in background and at least one message having an associated picture is received.

In some embodiments, the step of downloading pictures in a reverse chronological order of message receiving time according to address information of at least one message having an associated picture without requiring a download instruction comprises: waiting for a first preset duration and obtaining data usage generated during the first preset duration, when the downloading of a first picture is finished; continuing to wait for the first preset duration, and obtaining the data usage generated during the first preset duration, when the data usage is greater than a preset threshold; and downloading a second picture next to the first picture, when the data usage is not greater than the preset threshold. By doing so, the In some embodiments, the method may further comprise: for each picture, counting a duration used for downloading the picture in the picture downloading process; pausing the downloading of the picture, when the duration is longer than a second preset duration; continuing to download the picture, when receiving the instant message sent by another user again.

In some embodiments, the step of downloading the picture associated with the message according to the address information without requiring a download instruction comprises: downloading pictures in an order according to the respective pictures' sizes such that a smaller picture is larger picture without requiring a download instruction when obtaining the at least one message. For example, when the terminal receives multiple messages within a short time window, the terminal may download the picture having the smallest size first and then download the next picture of a greater size. By doing so, the terminal can have more pictures downloaded for a given amount of time. In this case, the pictures may be downloaded in neither a chronological order nor a reverse chronological order as described above.

In some embodiments, the method may further comprise: pausing the downloading of the picture when a preset event occurring in the picture downloading process is detected.

In some embodiments, the preset events comprises an event of opening another instant messaging session window, an event of opening a video call, an event of opening a voice call and an event of downloading other files.

In some embodiments, the method may further comprise: obtaining at least one old message having an associated picture, and downloading pictures in a chronological order of message receiving time according to address information of the at least one old message having an associated picture without requiring a download instruction, when the instant messaging session window is switched from background running to foreground display.

In some embodiments, the step of determining that the terminal is currently in a first network environment comprises: judging whether current data connection is a Wi-Fi connection or not; determining that the terminal is in the first network environment when the current data connection is a Wi-Fi connection.

All of the foregoing optional technical solutions may be combined in any forms to form the optional embodiments of the present application, and details are not described herein one by one again.

Figure 2A:
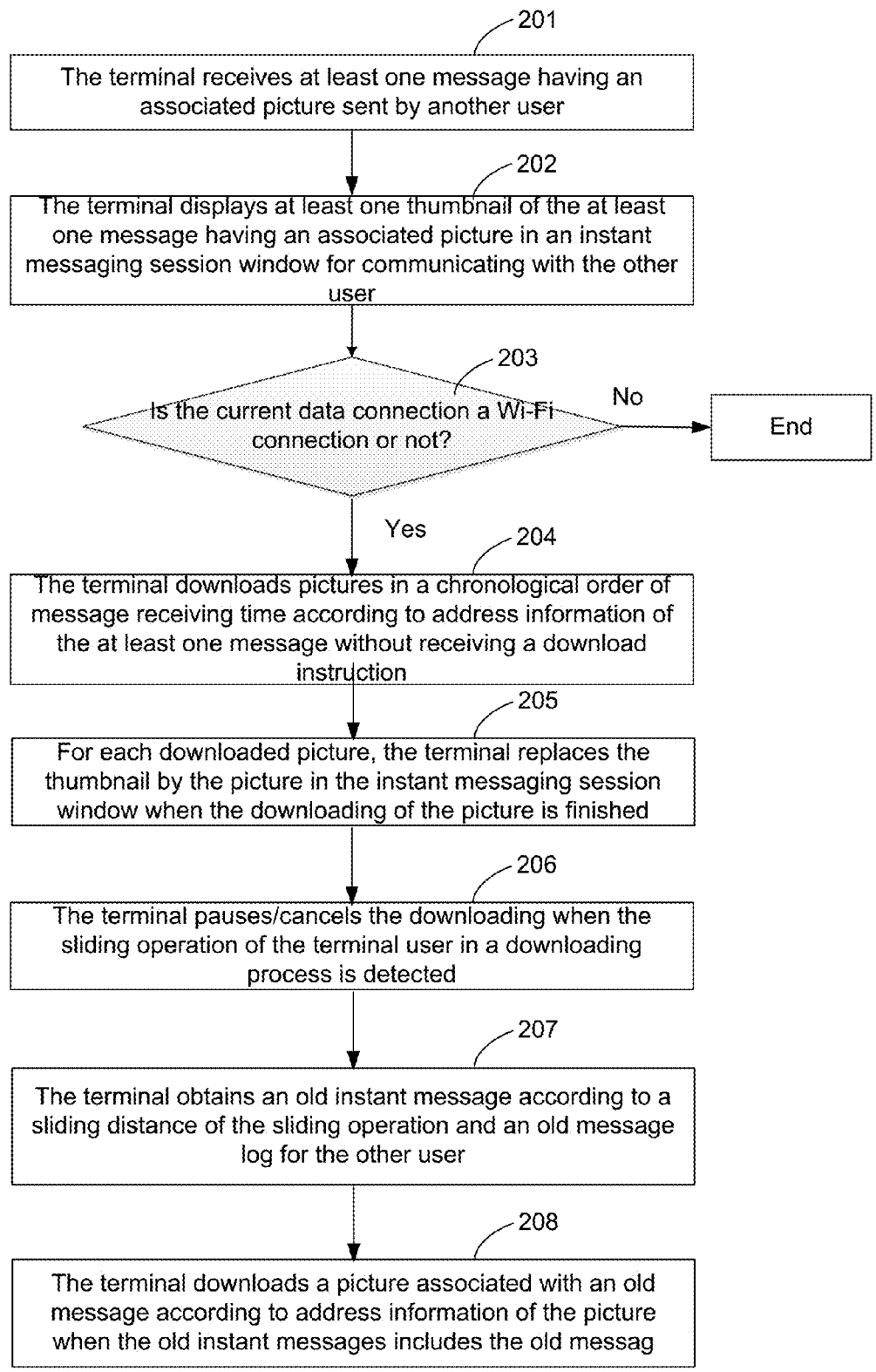
FIG. 2A is a flow chart of a picture displaying method according to some embodiments of the present application.

FIG. 2A is a flow chart of a picture displaying method according to some embodiments of the present application. The embodiments of the present application are applied to the scene that an instant messaging session window for communicating with another user is displayed in foreground. The execution main body in the embodiments of the present application is a terminal. Referring to FIG. 2A, the method comprises following steps.

Step 201: The terminal receives at least one message having an associated picture sent by another user.

Wherein an instant messaging application is used for transmitting instant messages between at least two users, the terminal installs the instant messaging application, and the instant messaging application provides the instant session window between a terminal user and any one user. The other user is any one user except for the terminal user. When the instant messaging session window for communicating with the other user is displayed in foreground, the terminal may transmit/receive the instant messages to/from the other user. Specifically the terminal obtains an instant message input by the terminal user in the instant messaging session window, sends the instant message to the other user, and displays the instant message in the instant messaging session window. Meanwhile, the terminal receives an instant message sent by the other user and displays the instant message in the instant messaging session window. Furthermore, the instant message may be an instant text message, a message having an associated picture, an instant audio message and the like, which is not limited in the embodiments of the present application.

Step 202: The terminal displays at least one thumbnail of the at least one message in an instant messaging session window for communicating with the other user.

In the embodiments of the present application, the instant message means that a picture is displayed in form of a thumbnail. When the terminal receives a message having an associated picture sent by the other user, it displays the thumbnail of the message in the instant messaging session window.

Figure 2C:
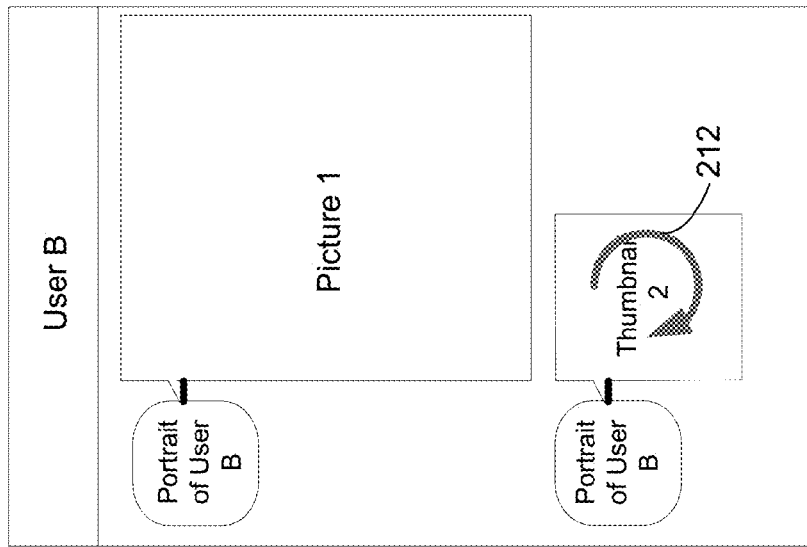
FIG. 2C is a schematic diagram of display of an instant messaging session window according to some embodiments of the present application.
Figure 2B:
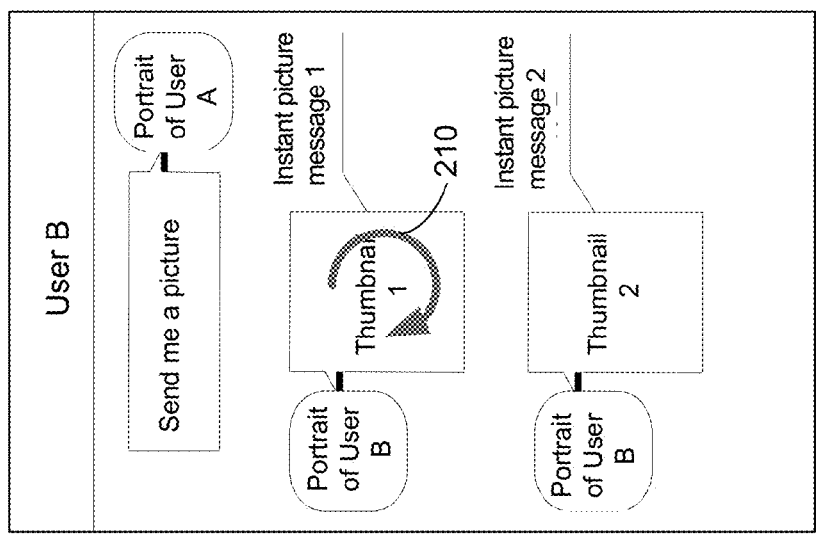
FIG. 2B is a schematic diagram of display of an instant messaging session window according to some embodiments of the present application.

FIG. 2B is a schematic diagram of an instant messaging session window between a terminal user and another user. Referring to FIG. 2B, in an instant messaging session between a user A and a user B, the terminal displays thumbnails, including a thumbnail 1 and a thumbnail 2, of two messages, each having an associated picture, in the instant messaging session window when the terminal receives two messages, each having an associated picture, including a message having an associated picture 1 and a message having an associated picture 2, sent by the user B.

Step 203: The terminal judges whether the current data connection is a Wi-Fi (wireless-fidelity) connection or not. If yes, the terminal executes a step of 204; otherwise, the terminal does not.

When the current data connection is a mobile network connection, the picture downloading speed is relatively slow, and the data usage may be charged at a high rate. The data usage used for downloading a picture is greater than the data usage used for receiving a text-based instant message. As such, the cost of data usage will increase if a picture associated with a message is downloaded when the message is received by the terminal. When the current data connection is a Wi-Fi connection (203—Yes), the picture downloading speed is relatively high, and the data usage will not be charged. Therefore, in the embodiments of the present application, the terminal firstly judges whether the current data connection is a Wi-Fi connection or not. If yes (203—Yes), the terminal determines that it is in the first network environment, and downloads the picture associated with the message. If not (203—No), the terminal determines that it is not in the first network environment, and does not download the picture associated with the message.

It should be noted that the embodiments of the present application is illustrated only by taking that the step 203 is carried out after the step 202 for an example. In some embodiments, the step 203 may be carried out before the step 202, which is not limited in the embodiments of the present application.

Step 204: The terminal downloads pictures in a chronological order of message receiving time according to address information of the at least one message without requiring a download instruction. Wherein the message comprises the address information of the pictures, and the terminal may download the pictures according to the address information.

In the embodiments of the present application, in order to ensure the information coherence of the message, the terminal may sequentially download at least one picture associated with the messages, each having an associated picture, in a chronological order of message receiving time according to the address information of the at least one message without requiring a download instruction when the terminal receives the messages sent by the other user. Referring FIG. 2B, the terminal firstly downloads a picture 1 corresponding to the thumbnail 1, and secondly downloads a picture 2 corresponding to the thumbnail 2 after the downloading of the picture 1 is finished in order to firstly display the picture 1 in the instant messaging session window, which is as shown in FIG. 2C. As shown in FIG. 2B, a visual cue such as the curved arrow sign 210 or a progress bar (not shown) on the thumbnail 1 indicates that the downloading of the picture 1 has started while there is no such visual cue on the thumbnail 2, indicating that the downloading of the picture 2 has not started yet.

In some embodiments, the terminal pauses the download of the picture when it is no longer in the first network environment while the picture has not been downloaded yet. For example, the wireless router providing the Wi-Fi connection may be shutdown or stopped for other reasons. In this case, the visual cue indicating that the picture is being downloaded may be replaced with a different visual cue indicating that the download of the picture is paused. If there is another wireless connection available to the terminal, e.g., via a cellular network, the terminal can resume the download of the picture after receiving a download instruction from the user.

In some embodiments, when the terminal receives a message having an associated picture sent by the other user, it adds address information included in the message to a download queue. The download queue comprises at least one picture's address information, and each address information corresponds to a picture to be downloaded. The terminal sequentially downloads pictures according to the at least one picture's address information in the download queue without requiring a download instruction. The terminal deletes the address information of the downloaded picture from the download queue after the downloading of a picture corresponding to any one picture's address information. Wherein the download queue is a first-in-first-out queue, and the terminal may download pictures in a chronological order of message receiving time when it downloads the pictures according to the download queue. Furthermore, the terminal may further preset a maximum number of address information entries in the download queue. When the number of address information entries in the download queue is greater than the maximum number, the terminal selects the maximum number of the address information entries in a chronological order of message receiving time, and deletes the remaining address information entries from the download queue. In some embodiments, the maximum number is 100.

Furthermore, while more and more instant messages are transmitted between the terminal user and the other user, the previously-transmitted instant messages slide upwards and even slide out of a display range of the instant messaging session window. At this time, the terminal does not display the instant messages sliding out of the display range. As a result, even though the terminal downloads pictures associated with the instant messages, the pictures are not displayed in the instant messaging session window. Therefore, in order to ensure that pictures associated with the messages in the display range are firstly downloaded, the step 204 may further comprise: the terminal judges whether the display range comprises a message having an associated picture in real time. When the display range comprises at least one message having an associated picture, the terminal downloads at least one picture associated with the messages in a chronological order of message receiving time. If the terminal detects that a message having an associated picture slides out of the display range in a process of downloading the picture, it may pause or cancel the downloading of a picture associated with the message sliding out of the display range, re-determines a message having an associated picture in the display range, and continues to download pictures associated with the messages in the display range.

Figure 2E:
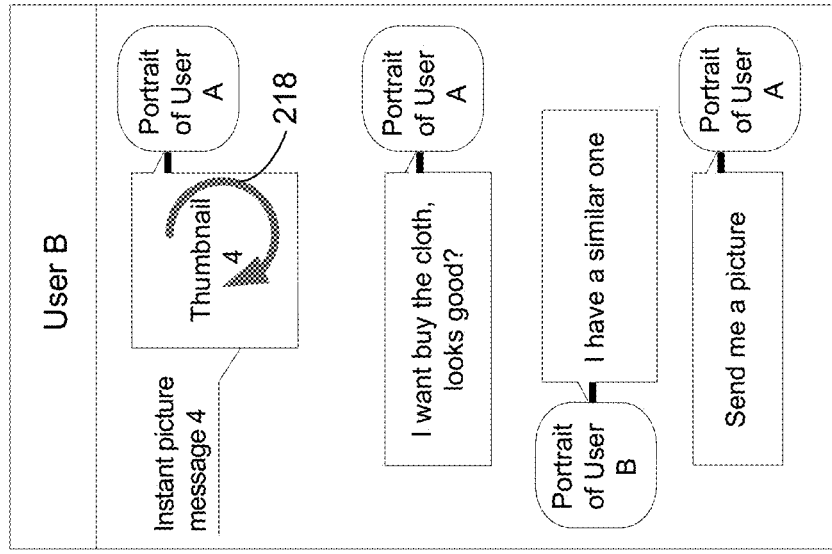
FIG. 2E is a schematic diagram of display of an instant messaging session window according to some embodiments of the present application.
Figure 2D:
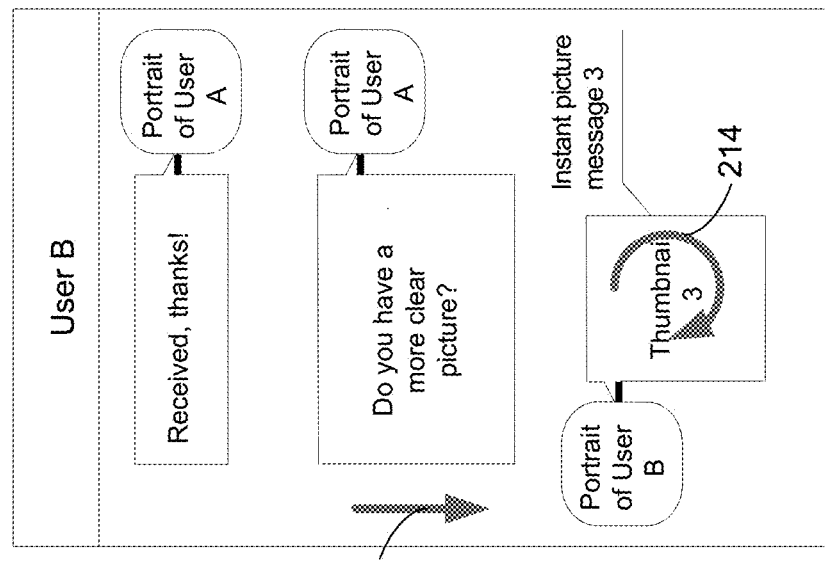
FIG. 2D is a schematic diagram of display of an instant messaging session window according to some embodiments of the present application.

Referring to FIG. 2C, the terminal starts downloading the picture 2 after finishing the downloading of the picture 1. Note that there is a curved arrow sign 212 on the thumbnail 2 indicating that the downloading of the picture 2 has started. During a process of downloading the picture 2, the terminal user and the other user may continuously transmit instant messages. As shown in FIG. 2D, when the message having an associated picture 2 slides out of the display range of the instant messaging session window, the terminal pauses or cancels the downloading of the picture 2. At this time, the terminal determines that the display range comprises a message having an associated picture 3 and then starts downloading a picture 3 associated with the message 3 (see, e.g., the curved arrow sign 214).

It should be noted that the embodiments of the present application are illustrated by taking an operation of downloading the at least one picture in a chronological order of message receiving time for an example. In some embodiments, the terminal may further download the at least one picture in a reverse chronological order of message receiving time, that is the terminal determines address information received at the latest time in the download queue and downloads the address information received at the latest time when the downloading of a picture is finished, which is not limited in the embodiments of the present application.

It should be further noted that the display range of the instant messaging session window is limited and an original picture associated with the message cannot be completely displayed in the instant messaging session window when it is oversize. Therefore, in order that the terminal user may conveniently browse the picture, the terminal may preset a maximum picture size and a minimum picture size. When downloading the picture associated with the message, the terminal firstly judges whether the size of the original picture is smaller than the maximum picture size, and secondly judges whether the size of the original picture is larger than the minimum picture size. When the size of the original picture is larger than the minimum size and smaller than the maximum picture size, the terminal downloads the original picture so as to display the original picture later. When the size of the original picture is not smaller than the maximum picture size, the terminal downloads the original picture, and performs proportional compression on the original picture so as to display the compressed picture later. When the size of the original picture is not larger than the minimum picture size, the terminal does not start the downloading of the original picture. In some embodiments, the maximum picture size is larger than the size of a display screen of the terminal, and the difference between the maximum picture size and the size of the display screen is within a preset range.

Step 205: For each downloaded picture, the terminal replaces the thumbnail by the picture in the instant messaging session window when the downloading of the picture is finished.

In the embodiments of the present application, when the terminal finishes the downloading of a picture, it determines a display area of a thumbnail corresponding to the downloaded picture in the messaging session window, displays the picture in the display area to replace the thumbnail. The size of the picture should be larger than the size of the thumbnail. Assuming that an instant message sent by the other user is displayed on the left side of the instant messaging session window, the terminal may display the picture by taking the top left corner of a display area of the thumbnail as the top left corner of the display area of the picture. Referring to FIG. 2B and FIG. 2C, the terminal displays the picture 1 in the display area of the thumbnail 1 when the downloading of the picture 1 is finished. Note that the first message in the instant messaging session window of FIG. 2B has been pushed out of the window to leave more room for displaying the picture 1.

Step 206: The terminal pauses/cancels the downloading when the sliding operation of the terminal user in a downloading process is detected.

When the terminal user needs to check an old instant message, it may trigger a downward sliding operation. When the terminal detects the downward sliding operation, it slides the messages in the instant messaging session window downwards, and redisplays an instant message according to a sliding distance. When the terminal user needs to check an instant message transmitted after the currently displayed old instant message, it may trigger an upward sliding operation. When the terminal detects the upward sliding operation, it slides the messages in the instant messaging session window upwards, and redisplays an instant message according to a sliding distance. When the terminal detects the upward sliding operation or the downward sliding operation of the terminal user in a process of downloading at least one picture, it firstly pauses/cancels the downloading of the at least one picture in order to ensure that the picture checked by the terminal user is firstly downloaded.

Step 207: The terminal obtains an old instant message corresponding to a sliding operation according to a sliding distance of the sliding operation and an old message log for the other user.

In the embodiments of the present application, the terminal generates a message log for the other user according to the transmitted instant messages in a process of transmitting/receiving an instant message to/from the other user. When the terminal detects the sliding operation, it obtains the sliding distance of the sliding operation, and determines an old instant message, which is the old instant message corresponding to the sliding operation, in a display range according to the sliding distance and the old message log for the other user. The old message log comprises transmission time of each old instant message. The content of each old instant message is different, and the size of a display area for displaying each old instant message is also different. Therefore, in order to determine the old instant message in the display range, by taking an upward sliding operation for an example, the terminal obtains the old instant message from the old message log in an order of transmission time from latest to earliest when the upward sliding operation is detected, and along with the upward sliding, the terminal sequentially displays the obtained old instant message in the display area. In two adjacently transmitted old instant messages, an old instant message transmitted at an earlier time is displayed above an old instant message transmitted at later time. When the upward sliding distance is up to the sliding distance corresponding to the sliding operation, the window stops sliding, and the terminal obtains the old instant message, which is the old instant message corresponding to the sliding operation, displayed in the display range.

Step 208: The terminal downloads a picture associated with an old message according to address information of the picture when the old instant messages includes the old message.

Referring to FIG. 2D, when the terminal detects a downward sliding operation 216 (e.g., the downward arrow sign in the figure) during a process of downloading a picture 3, it pauses or cancels the downloading of the picture 3. The messages in the instant messaging session window slides downwards along with the downward sliding operation 216 at this time. The terminal obtains an old instant message corresponding to the sliding operation according to a sliding distance and an old message log for the user B. As shown in FIG. 2E (an instant message displayed in the FIG. 2E is transmitted before the instant message displayed in the FIG. 2B), the old instant message comprises a message having an associated picture 4, so that the terminal downloads a picture 4 associated with the message 4 (see, e.g., the curved arrow sign 218). It should be noted that the embodiments of the present application merely concerns a message having an associated picture sent by the other user and received by the terminal when the instant messaging session window between the terminal user and the other user is displayed in foreground. For a message having an associated picture sent to the other user by the terminal, the terminal user has known specific picture contents of the messages, so that the terminal may display thumbnails or pictures corresponding to the messages in the instant messaging session window, which is not limited in the embodiments of the present application. However, for a message having an associated picture received by the terminal and sent by other user, except for the other user, the terminal may download pictures associated with the messages, and also download the pictures associated with the messages after the instant messaging session window for communicating with the other user is displayed in foreground, or may download the pictures associated with the messages after the downloading of the pictures associated with the messages sent by the other user is finished, which also are not limited in the embodiments of the present application.

According to the method provided in the embodiments of the present application, when the instant messaging session window for communicating with the other user is displayed in foreground, and when the terminal obtains the message sent by the other user in the first network environment, the terminal displays the thumbnail of the message, may directly download the picture associated with the message on the premise of not receiving the download instruction, and displays the picture after the downloading of the picture is finished. Therefore, the picture may be displayed clearly, the previewing effect is improved, the operation of user is simplified, and the efficiency for processing messages is improved. Furthermore, when the terminal detects the sliding operation, the terminal obtains the old message having an associated picture corresponding to the sliding operation, and downloads the picture associated with the old message having an associated picture, so that the user may browse the previously received picture merely by triggering the sliding operation. Therefore, the operation is simple and convenient.

Figure 3:
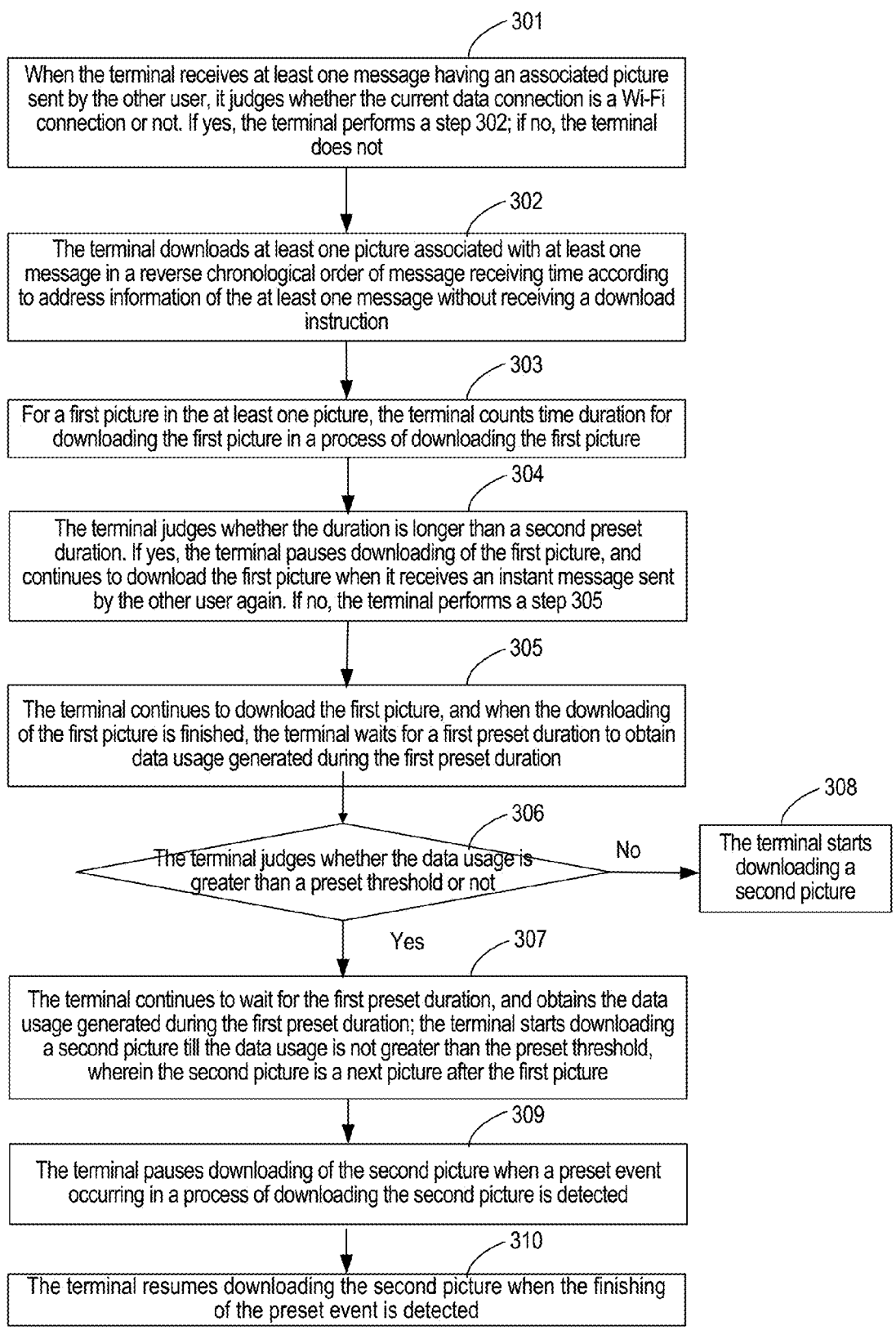
FIG. 3 is a flow chart of a picture displaying method according to some embodiments of the present application.

FIG. 3 is a flow chart of a picture displaying method according to some embodiments of the present application. The embodiments of the present application are applied to the scene that an instant messaging session window for communicating with another user runs in background. The execution main body in the embodiments of the present application is a terminal. Referring to FIG. 3, the method comprises:

Step 301: When the terminal receives at least one message having an associated picture sent by the other user, it judges whether current data connection is a Wi-Fi connection or not. If yes, the terminal performs step 302; if no, the terminal does not.

In a running process of an instant messaging application, the terminal may receive an instant message sent by any one user. By taking the other user for an example, when the instant messaging session window for communicating with the other user runs in background, the terminal still may receive an instant message sent by the other user. When the terminal receives the instant message sent by the other user, it firstly judges whether current data connection is a Wi-Fi connection or not. If the current data connection is a Wi-Fi connection, the terminal determines it is in a first network environment and downloads at least one picture associated with at least one message having an associated picture, so that the terminal does not need to display a thumbnail of the at least one message, but directly displays the at least one picture when the terminal opens the instant messaging session window for communicating with the other user later. If the current data connection is not the Wi-Fi connection, the terminal determines it is not in the first network environment and does not download the at least one picture, and when the terminal opens the instant messaging session window later, it displays the thumbnail of the at least one message. It should be noted that the embodiments of the invention are illustrated with a example in which the terminal is determined currently being in the first network environment when the current data connection is a Wi-Fi connection. However, in practical application, besides judging that the current data connection of the terminal is a Wi-Fi connection, the terminal may further judge whether a specific application runs or not, wherein the specific application is an application except for the instant messaging application, and the data usage of the specific application used for running is over a preset threshold. When the current data connection of the terminal is a Wi-Fi connection, and the terminal does not run the specific application, the terminal determines it is in the first network environment.

Step 302: The terminal downloads at least one picture associated with at least one message in a reverse chronological order of message receiving time according to address information of the at least one message without requiring a download instruction.

In the embodiments of the present application, the terminal receives at least one instant message sent by the other user. Next, if the terminal opens the instant messaging session window, it firstly displays an instant message received at the latest time in the at least one instant message. When instant messages sent by the other user are too many, the terminal displays an instant message received at the latest time at the bottom of the instant messaging session window, and instant messages received at the earlier time may be displayed out of a display range of the instant messaging session window. Therefore, in order to ensure that a picture associated with a message firstly displayed by the terminal is downloaded, the terminal downloads the picture in a reverse chronological order of message receiving time according to address information of the at least one message without requiring a download instruction.

For example, when the terminal sequentially receives a message having an associated picture 1 and a message having an associated picture 2 sent by the other user, the terminal downloads the picture 2 associated with the message 2. If the terminal receives a message having an associated picture 3 during a process of downloading the picture 2, it downloads the picture 3 associated with the message 3 after the downloading of the picture 2 is finished.

In some embodiments, when the terminal receives a message having an associated picture sent by the other user, it adds address information included in the message to a download queue. The download queue comprises at least one picture's address information, and each address information corresponds to a picture to be downloaded. The terminal sequentially downloads pictures according to the at least one picture's address information in the download queue without requiring a download instruction. The terminal deletes the address information of the downloaded picture from the download queue after the downloading of a picture corresponding to any one picture's address information. Wherein the download queue is a last-in-first-out queue, and the terminal may download the pictures in a reverse chronological order of message receiving time when it downloads the pictures according to the download queue.

Furthermore, the terminal may further preset a maximum number of address information entries in the download queue. When the number of address information entries in the download queue is greater than the maximum number, the terminal selects the address information of the maximum number in a reverse chronological order of message receiving time, and deletes the remaining address information entries from the download queue. In some embodiments, the maximum number is 100.

Step 303: For a first picture in the at least one picture, the terminal counts time duration for downloading the first picture in a process of downloading the first picture. Specifically, the terminal starts timing when it starts downloading the first picture so as to obtain the counted duration during the process of downloading the first picture.

Step 304: The terminal judges whether the duration is longer than a second preset duration. If yes, the terminal pauses downloading of the first picture, and continues to download the first picture when it receives an instant message sent by the other user again. If no, the terminal performs a step 305.

In the embodiments of the present application, the terminal judges whether the counted duration is longer than the preset duration in real time. When the counted duration is longer than the preset duration, the downloading time of the first picture is too long, so that the downloading of the first picture is paused in order to avoid consuming too much electric power. When the terminal receives a new instant message sent by the other user, the terminal continues to download the first picture.

Wherein the second preset duration may be set by technicians during development or by the terminal user in use, which is not limited in the embodiments of the present application. In some embodiments, the second preset duration is 20 minutes.

Step 305: The terminal continues to download the first picture, and when the downloading of the first picture is finished, the terminal waits for a first preset duration to obtain data usage generated during the first preset duration.

Step 306: The terminal judges whether the data usage is greater than a preset threshold or not. If yes, the terminal performs a step 307; if no, the terminal performs a step 308.

In the embodiments of the present application, when the downloading of the first picture is finished, the terminal does not directly download a second picture, but waits for the first preset duration, and calculates the data usage generated during the first preset duration. When the data usage is not greater than the preset threshold, other services processed by the terminal do not occupy too much network resource, so that the terminal may continue to download the second picture. When the data usage is greater than the preset threshold, the other services processed by the terminal occupy too much network resource, so that, in order to prevent resource competition from causing influence on the processing of the other services and ensure the service processing efficiency of the terminal, the terminal continues to wait for the first preset duration, and continues to calculate the data usage generated during the first preset duration, and the terminal starts downloading the second picture till the calculated data usage is not greater than the preset threshold. Wherein the first preset duration may be set by technicians during development or by the terminal user in use, which is not limited in the embodiments of the present application. In some embodiments, the first preset duration is 1 second.

Step 307: The terminal continues to wait for the first preset duration, and obtains the data usage generated during the first preset duration; the terminal starts downloading a second picture until the data usage is not greater than the preset threshold, wherein the second picture is a next picture after the first picture; the terminal performs a step 309.

Step 308: The terminal starts downloading a second picture, and then performs a step 309.

Step 309: The terminal pauses downloading of the second picture when a preset event occurs when a process of downloading the second picture.

In the embodiments of the present application, when the instant messaging session window for communicating with the other user is not displayed in foreground, and the terminal receives at least one message having an associated picture sent by the other user, the terminal does not need to immediately download at least one picture associated with the at least one message. In order to avoid the resource competition and ensure the service processing efficiency of the terminal, the terminal may preset multiple preset events. When the terminal detects any one preset event occurring in a process of downloading the picture, the terminal pauses downloading of the at least one picture and turns to process the preset event. Wherein the preset event may be an event of opening another instant messaging session window, an event of starting a video call, an event of starting a voice call, an event of downloading other files and the like, which is not limited in the embodiments of the present application.

Step 310: The terminal resumes downloading the second picture when the finishing of the preset event is detected.

In the embodiments of the present application, the occurring manners and ending manners of different preset events are also different. Based on the foregoing listed four preset events, the step 309 and the step 310 may comprise any one of following steps (1) to (4):

(1) When the terminal detects an instant messaging session window between the terminal user and a third user, except for the other user, is opened in a process of downloading the second picture, the terminal pauses the downloading of the second picture. When the terminal closes other instant messaging session window, or when the terminal finishes the downloading of a picture associated with a message in the other instant messaging session window, the terminal determines that the preset event is ended and resumes downloading the second picture.

(2) When the terminal detects the video call is opened during the process of downloading the second picture, it pauses downloading of the second picture. When the terminal closes the video call, it determines that the preset event is ended, and resumes downloading the second picture.

(3) When the terminal detects the voice call is opened during the process of downloading the second picture, it pauses downloading of the second picture. When the terminal closes the voice call, it determines that the preset event is ended, and resumes downloading the second picture.

(4) When the terminal detects downloading other files during the process of downloading the second picture is started, it pauses downloading of the second picture. When the downloading of the other files is finished, the terminal determines that the preset event is ended, and resumes downloading the second picture. Wherein the other files mean files, except for the at least one picture, and may be pictures associated with the message sent by other user, except for the other user, files sent by the other user or the other user through the instant messaging application, files downloaded by the terminal in a browser, and the like.

It should be noted that the terminal may open the instant messaging session window for the other user, that is, the instant messaging session window is switched from the background running to the foreground display. Therefore, after the step 309, the method may further comprises: when the terminal detects an operation of opening the instant messaging session window, it obtains at least one old instant message transmitted/received to/from the other user according to the old message log for the other user, and displays at least one history instant messaging information transmitted at later time in the instant messaging session window. Wherein the at least one old instant message transmitted at the later time is an at least one old instant message displayed in the display range when the terminal displays an old instant message transmitted at the latest time at the bottom of the instant messaging session window, and displays an old instant message transmitted at early time above an old instant message transmitted at a later time.

The instant message may comprise a first message having an associated picture that has been completely downloaded, and also may comprise a second message having an associated picture that has not been completely downloaded. Therefore, when the at least one instant message comprises the first message having an associated picture that has been completely downloaded, the terminal displays the completely downloaded picture in a display area of the first message having an associated picture. When the at least one instant message further comprises at least one second message having an associated picture that has not been completely downloaded, the terminal displays a thumbnail of the at least one second message having an associated picture in the at least one display area of the at least one second message having an associated picture, and according to address information of the at least one second message having an associated picture, the terminal downloads at least one picture associated with the at least second picture message in a reverse chronological order of message receiving time.

It should be noted that the instant messaging session window is displayed in foreground in the subsequent process, the terminal may process the received message having an associated picture sent by the other user according to the processing manner provided by the embodiments shown in FIG. 2A, and the details are not described herein again.

According to the method provided in the embodiments of the present application, when the instant messaging session window for communicating with the other user runs in background, and when the terminal obtains the message sent by the other user in the first network environment, the terminal directly downloads the picture associated with the message on the premise of not receiving the download. Therefore, when the terminal opens the instant messaging session window, the picture may be displayed clearly, the previewing effect is improved, the operation of user is simplified, and the efficiency for processing messages is improved. Furthermore, after the terminal downloads a picture, it waits for the first preset duration and calculates the data usage generated during the first preset duration. When the data usage is smaller than the preset threshold, the terminal downloads the next picture. The terminal also pauses the downloading when the preset event occurring in the downloading process is detected. Therefore, the resource competition is avoided, and the efficiency for processing services is improved. In addition, when the duration for downloading a picture is longer than the second preset duration, the terminal pauses the downloading, so that the electric power consumed by the terminal is saved.

Figure 4:
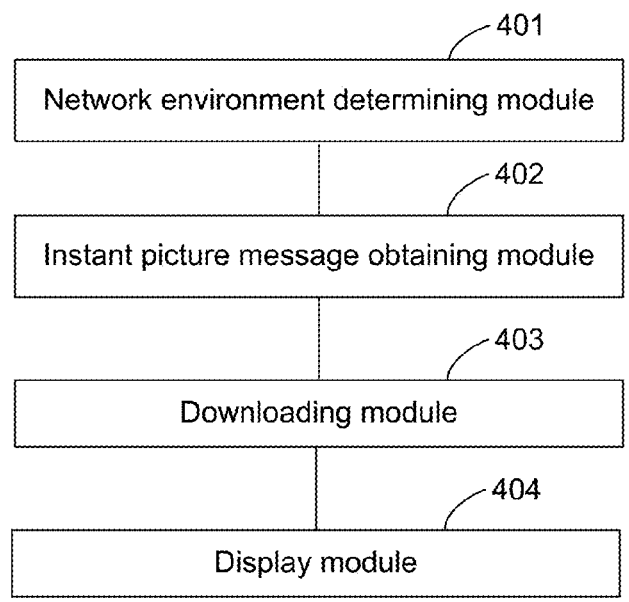
FIG. 4 is a structural block diagram of an apparatus for downloading and displaying pictures according to some embodiments of the present application.

FIG. 4 is a structural block diagram of an apparatus for downloading and displaying pictures according to some embodiments of the present application. Referring to FIG. 4, the apparatus comprises: a network environment determining module 401, used for determining that the terminal is in a first network environment; a message having an associated picture obtaining module 402, connected with the network environment determining module 401 and used for obtaining a message having an associated picture and including address information of the picture; a downloading module 403, connected with the message obtaining module 402 and used for downloading a picture associated with the message according to the address information without requiring a download instruction; a display module 404, connected with the downloading module 403 and used for displaying the picture in an instant messaging session window when the downloading of the picture is finished.

The apparatus provided in the embodiments of the present application directly downloads a picture associated with a message without requiring a download instruction when obtaining the message in a first network environment. Therefore, the picture may be displayed clearly, the previewing effect is improved, the operation of user is simplified, and the efficiency for processing messages is improved.

In some embodiments, the apparatus may further comprise: a firstly display module, used for displaying a thumbnail of the message in the instant messaging session window; a second display module, used for replacing the thumbnail by the picture in the instant messaging session window when the downloading of the picture is finished;

In some embodiments, when the downloading module 403 is used for downloading pictures according to an order of receiving time from earliest to latest according to address information of at least one message having an associated picture without requiring a download instruction when receiving the at least one message.

In some embodiments, the apparatus may further comprise: a sliding operation detecting module, used for cancelling the downloading when a sliding operation of a user occurring in a downloading process is detected; an old message obtaining module, used for obtaining an old instant message corresponding to the sliding operation according to a sliding distance of the sliding operation and an old message log; an old message downloading module, used for downloading a picture associated with an old message according to address information when the old instant message includes the old message having an associated picture.

In some embodiments, the apparatus may further comprise: a background downloading module, used for, when the instant messaging session window runs in background and at least one message having an associated picture is received, downloading pictures according to an order of receiving time from latest to earliest according to address information of at least one message having an associated picture without requiring a download instruction.

In some embodiments, the background downloading module comprises: a traffic obtaining unit, used for waiting for a first preset duration and obtaining data usage generated during the first preset duration when the downloading of a first picture is finished; a downloading waiting unit, used for, when the data usage is greater than a threshold, continuing to wait for the first preset duration and obtaining the data usage generated during the first preset duration, and when the data usage is not more than the threshold, downloading a second picture next to the first picture.

In some embodiments, the apparatus may further comprise: a downloading duration counting module, used for, to each picture, counting duration for downloading the picture in a process of downloading the picture; a first downloading pausing module, used for pausing the downloading of the picture when the duration is longer than a second preset duration; and a downloading continuing module, used for continuing to download the picture when the instant message sent by the other user is received again.

In some embodiments, the apparatus may further comprise: a second downloading pausing module, used for pausing the downloading when a present event occurring in the downloading process is detected.

In some embodiments, the preset events comprises an event of opening another instant messaging session window, an event of opening a video call, an event of opening a voice call and an event of downloading other files.

In some embodiments, the apparatus may further comprise: a switching module, used for, when the instant messaging session window is switched from background running to foreground display, obtaining at least one old message having an associated picture, and downloading pictures according to an order of receiving time from latest to earliest according to address information of the at least one old message having an associated picture without requiring a download instruction.

In some embodiments, the network environment determining module 401 comprises: a connection judging unit, used for judging whether the current data connection is a Wi-Fi connection; a network environment determining unit, used for determining that the terminal is in the first network environment currently when the current data connection is a Wi-Fi connection.

Figure 5:
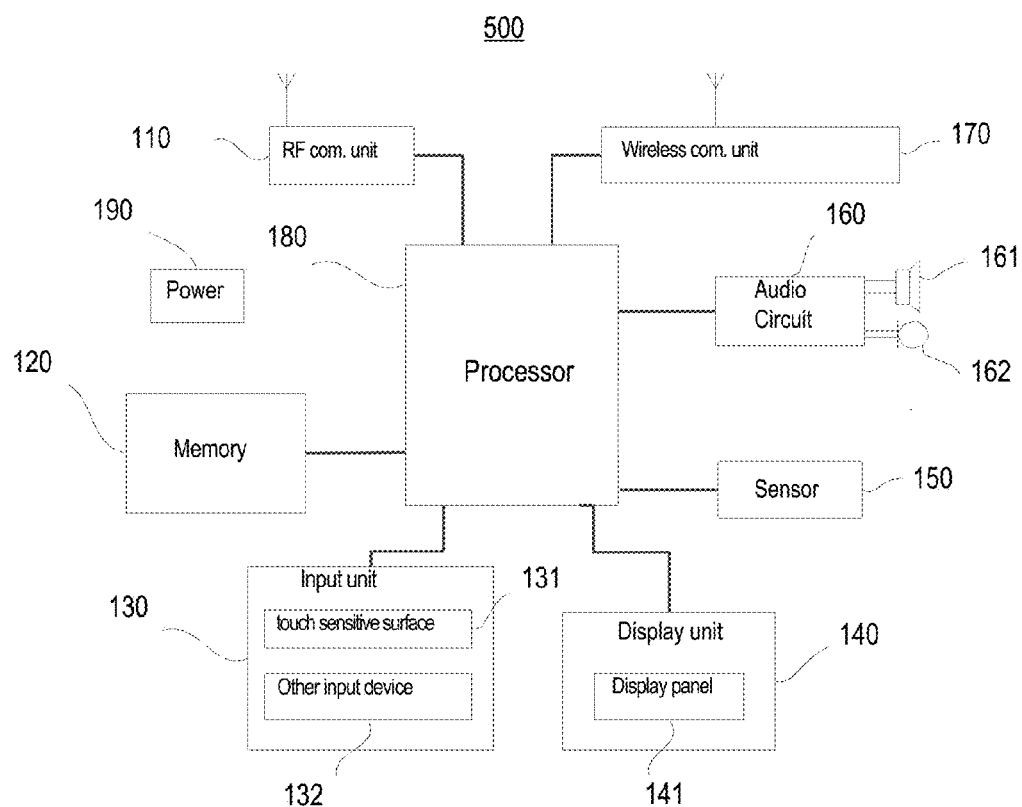
FIG. 5 is a structural block diagram of a computing device according to the embodiments of the present application.

FIG. 5 shows a structural block diagram of a computing device 500 related to in the embodiment of the present application. The computing device may be applied to implement the method for downloading and displaying pictures according to the foregoing embodiments. To be specific, the computing device 500 may comprise such parts as a communication unit 110, a memory 120 comprising one or more than one non-transitory computer readable storage medium, an input unit 130, a display unit 140, a sensor 150, an audio circuit 160, a Wi-Fi module 170, a processor comprising one or more than one processing core, a power supply 190 and the like. Those skilled in the art may understand that the computing device structure shown in the figure. does not define the computing device; the computing device may comprise parts more or fewer than that shown in the figure, or comprise combinations of some parts, or different part arrangements. The communication unit 110 may be configured to receive and send signals during a process of information exchange or talking. The communication unit 110 may be such network communication equipment as an RF (Radio Frequency, radio frequency) circuit, a router, a modem and the like. Specially, when the communication unit 110 is an RF circuit, the RF circuit after receives downlink information from a base station, sends the information over to one or more processors 180 for processing. Moreover, the RF circuit sends uplink data to the base station. Usually, the RF circuit serving as the communication unit comprises, but is not limited to an antenna, at least one amplifier, a tuner, one or more oscillators, a subscriber identity module (SIM) card, a transceiver, a couple, an LNA (Low Noise Amplifier, low noise amplifier), a duplexer and the like. In addition, the communication unit 110 may further be communicated with the network or other devices through radio communications. Any of communication standard or protocol may be used for radio communication, which comprises, but not limited to GSM (Global System of Mobile communication, global system of mobile communication), GPRS (General Packet Radio Service, general packet radio service), CDMA (Code Division Multiple Access, code division multiple address), WCDMA (Wideband Code Division Multiple Access, wideband code division multiple address), LTE (Long Term Evolution, long term evolution), an email, SMS (Short Messaging Service, short messaging service) and the like. The memory 120 may be configured to store software programs and modules. The processor 180 carries out various function applications and data processing through the software programs and modules stored in the memory 120. The memory 120 may mainly comprise a program storage area and a data storage area, wherein the program storage area may store the applications (such as sound playing function, image playing function and the like) required by an operating system, at least one function and the like. The data storage area may store the data (such as audio data, telephone directory and the like) created according to the use of the computing device 800, and the like. In addition, the memory 120 may comprises a high speed random access memory, and may further comprises a non-volatile memory, for example, at least one disk memory device, a flash memory device or other volatile solid state memory devices. Accordingly, the memory 120 may further comprise a memory controller so as to provide access of the processor 180 and the input unit 130 to the memory 120. The input unit 130 may be configured to receive inputted number or character information, and produce keyboard, mouse, joystick, optical or trackball signal input related to user settings and function control. Preferably, the input unit 130 may comprise a touch-sensitive surface 131 and other input devices 132. The touch-sensitive surface 131 is also called a touch display screen or a touchpad, which may collect a touch operation of the user on or near the touch-sensitive surface (for example, operation of the user on the touch-sensitive surface 131 or near the touch-sensitive surface 131 by using any proper object or accessory like fingers, stylus and the like), and drive a corresponding connecting device according to a preset program. In some embodiments, the touch-sensitive surface 131 may comprise two parts which include a touch detecting device and a touch controller. The touch detecting device detects a touch position and direction of the user and a signal brought by the touch operation, and transmits the signal to the touch controller. The touch controller receives touch information from the touch detecting device, and converts the touch information into contact coordinates, and then transmits the contact coordinates to the processor 180. Moreover, the touch controller can receive and carry out an instruction sent by the processor 180. Furthermore, the touch-sensitive surface 131 may be implemented in various types such as resistor type, capacitance type, infrared rays, surface acoustic waves and the like. Except the touch-sensitive surface, the input unit 130 may further comprise other input devices 132. Preferably, the other input devices 132 may comprise, but not limited to one or more of a physical keyboard, virtual (function) keys (such as volume control keys, switch keys etc.), trackballs, mouse, joysticks and the like. The display unit 140 may be configured to display the information provided by the user or the information provided to the user as well as various graphical user interfaces of the computing device 500, wherein the graphical user interfaces may be composed of graphs, texts, icons, videos and any combination thereof. The display unit 140 may comprise a display panel 141. In some embodiments, the display panel 141 may be configured by adopting such forms as LCD (Liquid Crystal Display, liquid crystal display), OLED (Organic Light-Emitting Diode, organic light emitting diode) and the like. Further, the touch-sensitive surface 131 may cover the display panel 141. When the touch-sensitive surface 131 detects the touch operation on or near the touch-sensitive surface, the touch-sensitive surface 131 transmits the touch operation to the processor 180 so as to determine the type of a touch event. Afterwards, the processor 180 provides corresponding visual output on the display panel 141 according to the type of the touch event. Although in FIG. 4, the touch-sensitive surface 131 and the display panel 141 are served as two independent parts to realize input and output functions, in some embodiments, the touch-sensitive surface 131 and the display panel 141 may be integrated to realize the input and output functions.

The computing device 500 may further comprise at least a sensor 150, for example, a light sensor, a motion sensor and other sensors. The light sensor may comprise an ambient light sensor and a proximity sensor, wherein the ambient light sensor may adjust the brightness of the display panel 141 according to the lighting of the ambient light, and the proximity sensor may close the display panel 141 and/or backlight when the computing device 500 approaches the ear. As one type of motion sensors, a gravity acceleration sensor may detect the acceleration in each direction (usually in three axial directions), may detect the value and direction of the gravity in a static state, may be used for an application used for recognizing a mobile phone gesture (such as switching between a horizontal screen and a vertical screen, switching related to a game, and calibration on the posture of a magnetometer), vibration identifying functions (such as for pedometer and striking) and the like, in the touch screen computing device. Furthermore, a gyroscope, a barometer, a humidity meter, a thermometer, an infrared sensor and other sensors may be integrated into the touch screen computing device 500, to which explanation are not repeated herein.

The audio circuit 160, a loud speaker 161 and a microphone 162 may provide an audio interface between the user and the computing device 500. The audio circuit 160 may transmit an electric signal converted from the received audio data to the loud speaker 161, and the loud speaker 161 converts the electric signal into a sound signal and outputs. On the other hand, the microphone 162 converts the collected sound signal into an electric signal. The audio circuit 160 receives the electric signal and converts the electric signal into audio data, and then outputs the audio data to the processor 180 to be processed so as to send the audio data to, for example, another computing device through the RF circuit 110 or output the audio data to the memory 120 for further processing. The audio circuit 160 may further possibly comprise an ear plug jack so as to provide communication between a peripheral earphone and the computing device 500. In order to realize radio communication, a radio communication unit 170 may be configured on the computing device, wherein the radio communication unit 170 may be a WIFI module. WIFI belongs to a short distance radio transmission technology. The computing device 500 may help the user receive and send an Email, browse web pages and access streaming media and the like through the radio communication unit 170. The radio communication unit provides radio wideband internet access for the user. Although the radio communication unit 170 is shown in the Figure, it is understandable that the radio communication unit does not belong to a required component of the computing device 500, and may be completely omitted as required without changing the scope of the present application.

The processor 180 is the control center of the computing device 500, which utilizes various interfaces and lines to connect with each part of the entire mobile phone, and carries out various functions of the computing device 800, and processes data through operating or carrying out the software program and/or module stored in the memory 120 and calling in the data stored in the memory 120, thus performing entire monitoring on the mobile phone. In some embodiments, the processor 180 may comprise one or more processing cores. Preferably, the processor 180 may integrate an application processor and a modulation-demodulation processor, wherein the application processor is mainly used for the operating system, the user interface and applications and the like, and the modulation-demodulation processor is mainly used for radio communication. It is understandable that the foregoing modulation-demodulation processor may also not be integrated into the processor 180.

The computing device 800 further comprises a power supply 190 (such as a battery) that supplies power to each part. Preferably, the power supply may be logically connected with the processor 180 through a power supply management system, thus realizing to management of power charging, power discharging and power consumption and the like through the power supply management system. The power supply 190 may further comprise any component such as one or more direct current or alternating current power supplies, a recharging system, a power failure detection circuit, a power supply convertor or inverter, a power supply status indicator and the like.

In the embodiment, the computing device 500 further comprises a memory and one or more program modules as described above in connection with FIG. 4, wherein one or more program modules is stored in the memory 120, and one or more processors are configured to carry out an instruction included in one or more program modules for performing the method according to the embodiment of the present application, comprising receiving an instant message, the instant message having an associated picture and including address information of the picture; determining whether the computing device is in a first network environment or not; when the computing device is in the first network environment: displaying a thumbnail of the picture on the screen and a visual cue indicating that the picture is being downloaded;

downloading the picture associated with the instant message according to the address information without receiving a download instruction from a user of the computing device; and replacing the thumbnail with the picture after the picture is downloaded.

It should be noted that examples are provided for description based on dividing of the foregoing functional modules when the apparatus provided by the foregoing embodiments displays the pictures. In actual application, the foregoing functions may be assigned to different functional modules for completion as required. That is, an internal structure of the terminal is divided into different functional modules to complete all or a part of the functions described in the foregoing. Furthermore, the apparatus provided by the foregoing embodiments is of the same concept with an embodiment of the picture displaying method, and the detailed information can be found in the description of the embodiments of the method, and will not be described herein.

Those skilled in the art may appreciate that all or some steps of the above embodiments may be implemented in hardware, or may be implemented by the related hardware instructed by a program, the program may be stored in a computer readable storage medium, which may be a read-only memory, a magnetic disk, or an optical disk, etc. The above description is merely some preferred embodiments of the present application, and is not used to limit the present application. Any modifications, equivalent alternatives, and improvements within the spirit and principle of the present application shall be included in the protection scope of the present application.

While particular embodiments are described above, it will be understood it is not intended to limit the invention to these particular embodiments. On the contrary, the invention includes alternatives, modifications and equivalents that are within the spirit and scope of the appended claims. Numerous specific details are set forth in order to provide a thorough understanding of the subject matter presented herein. But it will be apparent to one of ordinary skill in the art that the subject matter may be practiced without these specific details. In other instances, well-known methods, procedures, components, and circuits have not been described in detail so as not to unnecessarily obscure aspects of the embodiments.

Although the terms first, second, etc. may be used herein to describe various elements, these elements should not be limited by these terms. These terms are only used to distinguish one element from another. For example, first ranking criteria could be termed second ranking criteria, and, similarly, second ranking criteria could be termed first ranking criteria, without departing from the scope of the present application. First ranking criteria and second ranking criteria are both ranking criteria, but they are not the same ranking criteria.

The terminology used in the description of the invention herein is for the purpose of describing particular embodiments only and is not intended to be limiting of the invention. As used in the description of the invention and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, operations, elements, and/or components, but do not preclude the presence or addition of one or more other features, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

Although some of the various drawings illustrate a number of logical stages in a particular order, stages that are not order dependent may be reordered and other stages may be combined or broken out. While some reordering or other groupings are specifically mentioned, others will be obvious to those of ordinary skill in the art and so do not present an exhaustive list of alternatives. Moreover, it should be recognized that the stages could be implemented in hardware, firmware, software or any combination thereof.

The foregoing description, for purpose of explanation, has been described with reference to specific implementations. However, the illustrative discussions above are not intended to be exhaustive or to limit the invention to the precise forms disclosed. Many modifications and variations are possible in view of the above teachings. The implementations were chosen and described in order to best explain principles of the invention and its practical applications, to thereby enable others skilled in the art to best utilize the invention and various implementations with various modifications as are suited to the particular use contemplated. Implementations include alternatives, modifications and equivalents that are within the spirit and scope of the appended claims. Numerous specific details are set forth in order to provide a thorough understanding of the subject matter presented herein. But it will be apparent to one of ordinary skill in the art that the subject matter may be practiced without these specific details. In other instances, well-known methods, procedures, components, and circuits have not been described in detail so as not to unnecessarily obscure aspects of the implementations.

What is claimed is:

1. A computer-implemented method of downloading and displaying pictures associated with instant messages on a screen of a computing device, the method comprising:
   at the computing device having one or more processors and memory for storing program modules to be executed by the processors:
      receiving an instant message, the instant message having an associated picture and including address information of the picture;
      determining whether the computing device has a Wi-Fi connection or not;
      when the computing device has the Wi-Fi connection:
         displaying a thumbnail of the picture on the screen and a visual cue indicating that the picture is being downloaded;
         downloading the picture associated with the instant message according to the address information without receiving a download instruction from a user of the computing device; and
         replacing the thumbnail with the picture after the picture is downloaded.

2. The method of claim 1, further comprising:
while the picture is being downloaded:
pausing the download of the picture when the computing device no longer has the Wi-Fi connection; and
replacing the visual cue with a second visual cue indicating that the download of the picture is paused.

3. The method of claim 2, further comprising:
resuming the download of the picture after receiving a download instruction from the user of the computing device; and
replacing the thumbnail with the picture after the picture is downloaded.

4. The method of claim 1, wherein the instant message is one of a list of instant messages received by the computing device, the method further comprising:
while the picture is being downloaded:
detecting a user instruction to slide the list of instant messages on the screen;
in response to the user instruction:
pausing the download of the picture;
determining, among the list of instant messages, a second instant message having an associated second picture and including address information of the second picture based on the user instruction; and
downloading the second picture associated with the second instant message according to the address information without receiving a download instruction from the user of the computing device.

5. The method of claim 4, wherein the download of the second picture is started before the second instant message appears on the screen.

6. The method of claim 1, further comprising:
receiving multiple instant messages, each having an associated picture and including address information of the picture;
displaying a thumbnail of each picture on the screen and a visual cue indicating that the picture is being downloaded; and
downloading the pictures associated with the instant messages according to the respective address information without receiving any download instruction from the user of the computing device.

7. The method of claim 6, wherein the pictures are downloaded in a chronological order of the multiple instant messages' receiving time.

8. The method of claim 6, wherein the pictures are downloaded in a reverse chronological order of the multiple instant messages' receiving time.

9. The method of claim 6, wherein the pictures are downloaded in an order according to the sizes of pictures associated with the multiple instant messages and a picture of a smaller size is downloaded before a picture of a larger size.

10. The method of claim 6, wherein the multiple instant messages are from multiple senders, the method further comprising:
suspending downloading a first picture sent by a sender when the amount of time used for downloading the first picture exceeds a predefined threshold level; and
resuming the download of the first picture after receiving a new instant message from the sender.

11. A computing device comprising:
one or more processors;
memory;
a screen; and
one or more program modules stored in the memory and to be executed by the processors, the one or more program modules further including instructions for:
receiving an instant message, the instant message having an associated picture and including address information of the picture;
determining whether the computing device has a Wi-Fi connection or not;
when the computing device has the Wi-Fi connection:
displaying a thumbnail of the picture on the screen and a visual cue indicating that the picture is being downloaded;
downloading the picture associated with the instant message according to the address information without receiving a download instruction from a user of the computing device; and
replacing the thumbnail with the picture after the picture is downloaded.

12. The computing device of claim 11, wherein the one or more program modules further include instructions for:
while the picture is being downloaded:
pausing the download of the picture when the computing device no longer has the Wi-Fi connection; and
replacing the visual cue with a second visual cue indicating that the download of the picture is paused.

13. The computing device of claim 11, wherein the instant message is one of a list of instant messages received by the computing device, and the one or more program modules further include instructions for:
while the picture is being downloaded:
detecting a user instruction to slide the list of instant messages on the screen;
in response to the user instruction:
pausing the download of the picture;
determining, among the list of instant messages, a second instant message having an associated second picture and including address information of the second picture based on the user instruction; and
downloading the second picture associated with the second instant message according to the address information without receiving a download instruction from the user of the computing device.

14. The computing device of claim 11, wherein the one or more program modules further include instructions for:
receiving multiple instant messages, each having an associated picture and including address information of the picture;
displaying a thumbnail of each picture on the screen and a visual cue indicating that the picture is being downloaded; and
downloading the pictures associated with the instant messages according to the respective address information without receiving any download instruction from the user of the computing device.

15. The computing device of claim 14, wherein the pictures are downloaded in a reverse chronological order of the multiple instant messages' receiving time.

16. The computing device of claim 14, wherein the pictures are downloaded in an order according to sizes of pictures associated with the multiple instant messages and a picture of a smaller size is downloaded before a picture of a larger size.

17. The computing device of claim 14, wherein the multiple instant messages are from multiple senders, and the one or more program modules further include instructions for suspending downloading a first picture sent by a sender when the amount of time used for downloading the first picture exceeds a predefined threshold level; and resuming the download of the first picture after receiving a new instant message from the sender.

18. A non-transitory computer readable medium storing one or more program modules, wherein the one or more program modules, when executed by a computing device having one or more processors, cause the computing device to perform the following operations:

receiving an instant message, the instant message having an associated picture and including address information of the picture;

determining whether the computing device has a Wi-Fi connection or not;

when the computing device has the Wi-Fi connection:

displaying a thumbnail of the picture on the screen and a visual cue indicating that the picture is being downloaded;

downloading the picture associated with the instant message according to the address information without receiving a download instruction from a user of the computing device; and replacing the thumbnail with the picture after the picture is downloaded.

* * * * *